United States Patent
Fujita et al.

(10) Patent No.: US 11,338,791 B2
(45) Date of Patent: May 24, 2022

(54) ELECTRIC DEVICE AND METHOD FOR CONTROLLING ELECTRIC DEVICE

(71) Applicant: Nissan Motor Co., Ltd., Yokohama (JP)

(72) Inventors: Yuki Fujita, Kanagawa (JP); Shunsuke Baba, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 45 days.

(21) Appl. No.: 16/771,144

(22) PCT Filed: Dec. 15, 2017

(86) PCT No.: PCT/JP2017/045182
§ 371 (c)(1),
(2) Date: Jun. 9, 2020

(87) PCT Pub. No.: WO2019/116562
PCT Pub. Date: Jun. 20, 2019

(65) Prior Publication Data
US 2021/0162982 A1    Jun. 3, 2021

(51) Int. Cl.
*B60W 20/15* (2016.01)
*B60W 10/06* (2006.01)
*B60W 10/08* (2006.01)

(52) U.S. Cl.
CPC .......... *B60W 20/15* (2016.01); *B60W 10/06* (2013.01); *B60W 10/08* (2013.01); *B60W 2510/0638* (2013.01); *B60W 2510/081* (2013.01)

(58) Field of Classification Search
CPC ...... B60W 20/15; B60W 10/06; B60W 10/08; B60W 2510/0638; B60W 2510/081; B60W 2710/0644; B60W 2710/083; B60W 2710/081; B60W 2710/0605; B60W 2030/206; B60W 30/192; B60W 20/00;
(Continued)

(56) References Cited

U.S. PATENT DOCUMENTS

| 2017/0101086 A1 | 4/2017 | Oshiumi |
| 2018/0056974 A1* | 3/2018 | Meyer ............. B60W 30/18054 |
| 2019/0153991 A1 | 5/2019 | Hoshino |

FOREIGN PATENT DOCUMENTS

| EP | 1826376 A1 | 8/2007 |
| JP | 2015-182662 A | 10/2015 |
| WO | 2017195629 A1 | 11/2017 |

* cited by examiner

*Primary Examiner* — Joseph J Dallo
*Assistant Examiner* — Yi-Kai Wang
(74) *Attorney, Agent, or Firm* — Young Basile Hanlon & MacFarlane, P.C.

(57) ABSTRACT

A method for controlling an electric device including: a step of comparing the rotation speed of an internal combustion engine at the time when it has been determined that the internal combustion engine is to transition to a rotation stop state with a specified threshold; and a step of performing rotation-speed increasing control, in a case where the rotation speed of the internal combustion engine at the time of the determination is higher than the threshold, in which in a case where the rotation speed of the internal combustion engine at the time of the determination is not higher than the threshold, the rotation speed of the internal combustion engine is not made higher than the rotation speed at the time of the determination but is let to decrease to stop the internal combustion engine.

23 Claims, 7 Drawing Sheets

(58) Field of Classification Search
CPC ..... Y02T 10/72; Y02T 10/62; F02D 2250/24; F02D 31/001; F02D 41/08; F02D 41/042; F02D 2200/101; B60Y 2300/192; B60Y 2300/65; B60Y 2200/92

See application file for complete search history.

ELECTRIC DEVICE AND METHOD FOR CONTROLLING ELECTRIC DEVICE

TECHNICAL FIELD

The present invention relates to an electric device having an internal combustion engine and a method for controlling the electric device.

BACKGROUND

Electric devices capable of controlling the rotation speed of an internal combustion engine, such as an engine, by using torque generated by a motor have been used for automobiles employing hybrid systems. For example, in the invention disclosed in Japanese Patent Application Publication No. 2015-182662, in stopping an engine, a clutch provided in a power transmission route between a power split mechanism and the engine is disengaged and power supply to the motor is stopped to reduce electric power consumption.

Unfortunately, Japanese Patent Application Publication No. 2015-182662 does not state prohibiting a stop control for the engine in the case the rotation speed of the engine is low. Hence, in the case where setting is made such that the rotation speed of the engine temporarily increases in stop operation, when the stop operation is performed in a state where the rotation speed of the engine is low, the rotation speed increases and after that, the engine stops. This operation makes the driver feels the sense of incongruity due to a change in vibration and operation noise and other factors.

SUMMARY

The present invention has been made in light of the above problem, and an object thereof is to provide an electric device that prevents the occurrence of the sense of incongruity resulting from stop operation for an internal combustion engine and also to provide a method for controlling the electric device.

A summary of a method for controlling an electric device according to an aspect of the present invention is that, in a case where the rotation speed of the internal combustion engine at the time when it has been determined that the internal combustion engine is to transition to a rotation stop state is higher than a specified threshold, rotation-speed increasing control is performed for making the rotation speed of the internal combustion engine temporarily higher than the rotation speed at the time of the determination, and in a case where the rotation speed of the internal combustion engine at the time of the determination is not higher than the threshold, the rotation speed of the internal combustion engine is not made higher than the rotation speed at the time of the determination but is let to decrease.

A summary of an electric device according to another aspect of the present invention is that, in a case where the rotation speed of the internal combustion engine at the time when it has been determined that the internal combustion engine is to transition to a rotation stop state is higher than a specified threshold, rotation-speed increasing control is performed for making the rotation speed of the internal combustion engine temporarily higher than the rotation speed at the time of the determination, and in a case where the rotation speed of the internal combustion engine at the time of the determination is not higher than the threshold, the rotation speed of the internal combustion engine does not become higher than the rotation speed at the time of the determination but decreases.

A summary of an electric device according to still another aspect of the present invention is that, in a case where the rotation speed of the internal combustion engine at the time when it has been determined that the internal combustion engine is to transition to a rotation stop state is higher than a specified threshold, the rotation speed of the internal combustion engine increases, and in a case where the rotation speed of the internal combustion engine at the time of the determination is not higher than the threshold, the rotation speed of the internal combustion engine monotonously decreases.

The present invention provides an electric device that prevents the occurrence of the sense of incongruity resulting from stop operation for an internal combustion engine and also provides a method for controlling the electric device.

DETAILED DESCRIPTION

An embodiment will be described with reference to the drawings. In illustration of the drawings, the same constituents are denoted by the same reference signs, and description thereof is omitted.

Figure 1:
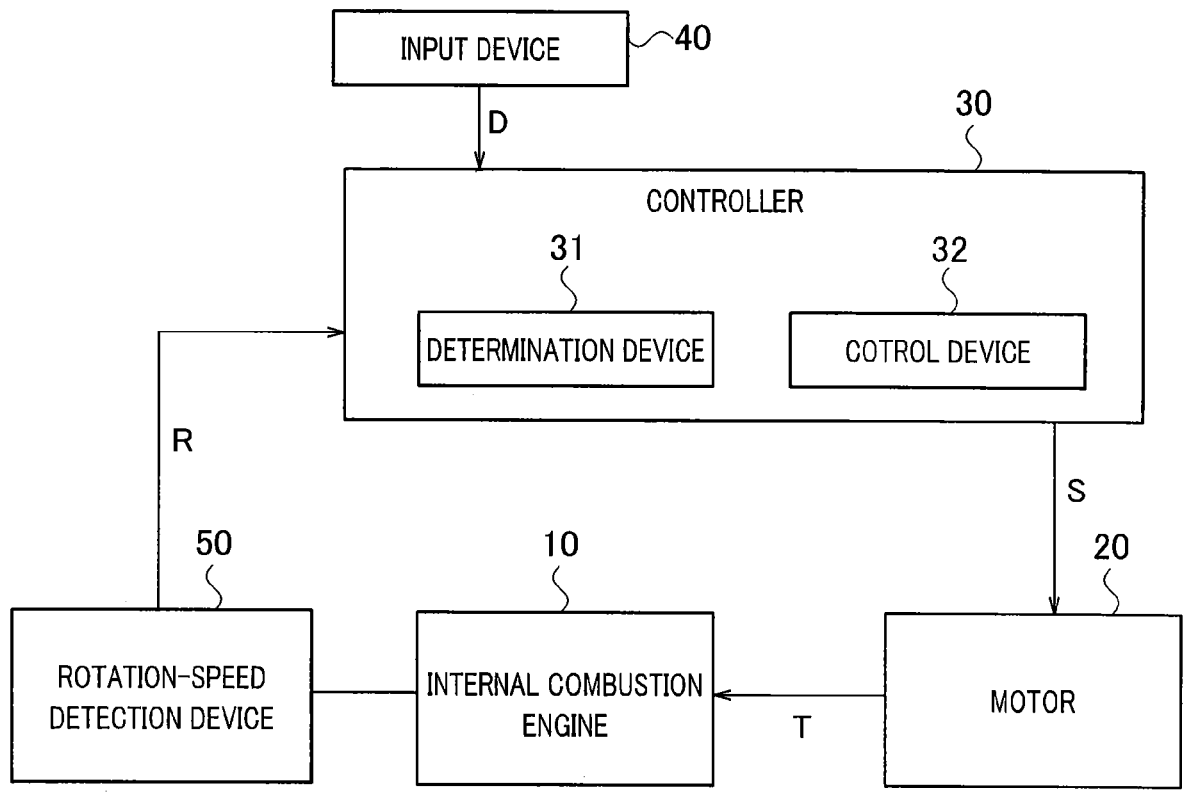
FIG. 1 is a schematic diagram illustrating the configuration of an electric device according to an embodiment.

As illustrated in FIG. 1, an electric device according to an embodiment of the present invention includes an internal combustion engine 10, a motor 20 that drives the internal combustion engine 10, and a controller 30. The electric device further includes an input device 40 and a rotation-speed detection device 50. A process signal used for setting the process of the controller 30 is transmitted to the controller 30 via the input device 40. The rotation speed R of the internal combustion engine 10 detected by the rotation-speed detection device 50 is transmitted to the controller 30.

Control signal S transmitted from the controller 30 controls torque T that the motor 20 outputs to the internal combustion engine 10 to drive the internal combustion engine 10. The rotation speed of the internal combustion engine 10 is set through this operation. The electric device illustrated in FIG. 1 is used as part of a power generation system of a hybrid automobile including, for example, an engine, which is the internal combustion engine 10, and a motor, which is the motor 20.

In the case where the rotation speed R of the internal combustion engine 10 at the time when it is determined that the internal combustion engine 10 is to transition to a rotation stop state is higher than a specified threshold, the controller 30 performs rotation-speed increasing control for making the rotation speed R of the internal combustion engine 10 temporarily higher than the rotation speed at the time of the determination. On the other hand, in the case where the rotation speed R of the internal combustion engine 10 at the time of the determination is not higher than the threshold, the controller 30 does not perform the rotation-speed increasing control. In other words, in the case where the rotation speed R is not higher than the threshold, the rotation speed R of the internal combustion engine 10 does not go up higher than the rotation speed at the time of the determination but decreases, and the internal combustion engine 10 comes to a stop.

Figure 2:
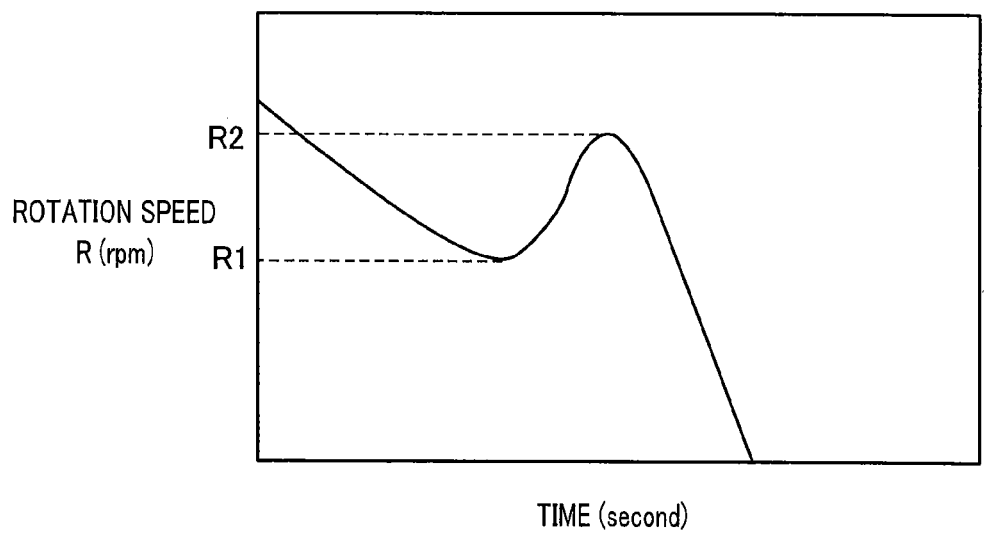
FIG. 2 is a graph illustrating an example of rotation-speed increasing control.

FIG. 2 illustrates an example of the rotation-speed increasing control performed by the controller 30. In the rotation-speed increasing control illustrated in FIG. 2, the rotation speed R of the internal combustion engine 10 that is transitioning to the rotation stop state increases from rotation speed R1 to rotation speed R2. After that, the rotation speed R decreases gradually, and the internal combustion engine 10 comes to the rotation stop state. In the rotation-speed increasing control, it is preferable that the controller 30 keep controlling the rotation speed R of the internal combustion engine 10 until the rotation of the internal combustion engine 10 comes to a stop.

The rotation-speed increasing control for the internal combustion engine 10 is effective in reducing vibration of the electric device and for other purposes. The reason is as follows: Specifically, in terms of the output of the internal combustion engine 10, a larger amount of air within the cylinders of the internal combustion engine 10 increases the repulsive force to external force for rotation produced by the motor 20 in the compression stroke. Conversely, in the power stroke, a larger amount of air increases the repulsive force seeking to return. These repulsive forces are conveyed to stationary members of the internal combustion engine 10, causing vibration. For this reason, the rotation speed R of the internal combustion engine 10 is made temporarily high (hereinafter referred to as "boost development") to release the pressure inside the cylinders, and this generates a negative pressure and reduces the vibration of the electric device.

The controller 30 is capable of performing the rotation-speed increasing control by controlling the motor 20 using, for example, rotation-speed agreement control that makes the rotation speed of the internal combustion engine 10 in agreement with a target rotation speed. Increasing the rotation speed R of the internal combustion engine 10 gradually by the rotation-speed agreement control reduces the sense of incongruity caused by the operation noise of the internal combustion engine 10. The rotation speed R is increased with the throttle remaining closed, and this releases the pressure inside the cylinders effectively. In addition, the increased rotation speed R is decreased gradually by the controller 30 controlling the rotation speed R of the internal combustion engine 10 until the internal combustion engine 10 comes to the rotation stop state, and this makes it possible to decrease the sense of incongruity caused by the operation noise of the internal combustion engine 10.

The controller 30 determines that the internal combustion engine 10 is to transition to the rotation stop state, in the case where the controller 30 receives a stop instruction for stopping the internal combustion engine 10 or other cases. For example, it is determined that the internal combustion engine 10 is to transition to the rotation stop state, based on a stop request operation performed by an operator of the electric device.

Specifically, in the case where the electric device illustrated in FIG. 1 is used as part of a power generation system of a hybrid automobile, when the driver performs a stop request operation for the internal combustion engine 10, the controller 30 receives a stop instruction D to stop the internal combustion engine 10 via the input device 40. Then, the controller 30, detecting the stop request operation, determines whether to perform the rotation-speed increasing control, based on the result of comparison between the rotation speed R of the internal combustion engine 10 at the time of the determination and a threshold.

Meanwhile, the inventors found that boost development from a low rotation speed sometimes makes the driver of the automobile feel the sense of incongruity. For example, the driver feels the sense of incongruity when the rotation-speed increasing control is performed in the state where the rotation speed R of the internal combustion engine 10 is unintentionally low or in a like case. In particular, when the rotation speed R of the internal combustion engine 10 increases from a low rotation speed after a stop request operation performed by the operator, the driver feels a greater sense of incongruity than in the case of not involving the stop request operation.

Figure 3:
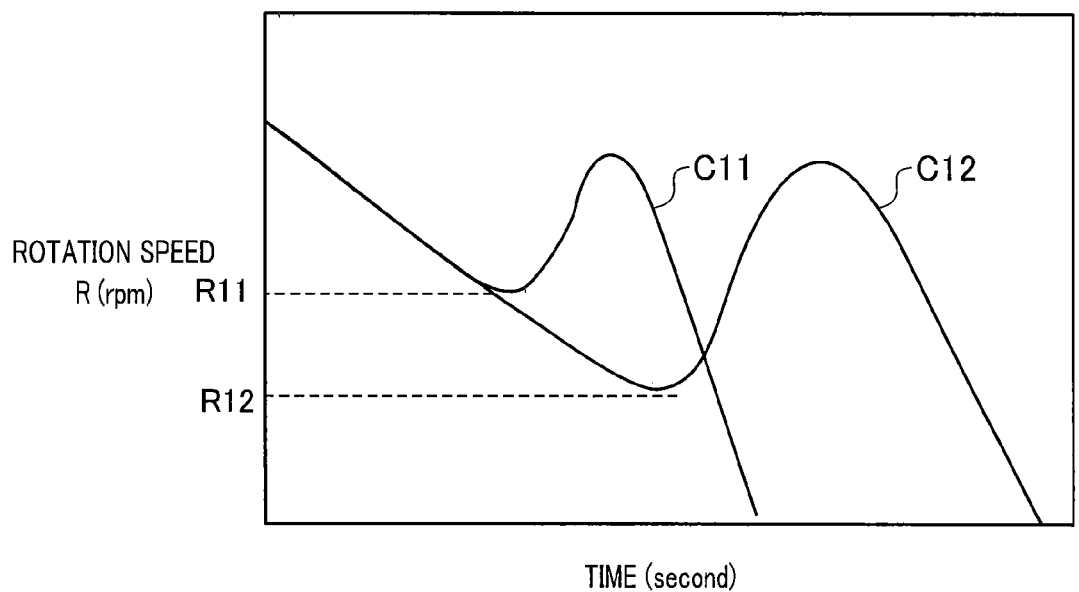
FIG. 3 is a graph for explaining the occurrence of the sense of incongruity resulting from stop operation for an internal combustion engine.

For example, the increase of rotation speed R from rotation speed R11, as rotation speed characteristic C11 illustrated in FIG. 3, does not cause the sense of incongruity, but as rotation speed characteristic C12, the increase of rotation speed R from rotation speed R12, which is lower than rotation speed R11, causes the sense of incongruity.

Hence, in the electric device illustrated in FIG. 1, the controller 30 performs the rotation-speed increasing control only in the case where the rotation speed R of the internal combustion engine 10 at the time when the controller 30 determines that the internal combustion engine 10 is to transition to the rotation stop state is higher than a specified threshold. The threshold of rotation speed R is set to a rotation speed which does not cause the sense of incongruity when the rotation speed R is increased from a rotation speed higher than the threshold.

In the case where the rotation speed R of the internal combustion engine 10 at the time of the determination is not higher than the specified threshold, the rotation-speed increasing control is not performed. Specifically, from the time of the determination, rotation speed R monotonously decreases without increasing. Thus, the sense of incongruity resulting from the stop operation for the internal combustion engine 10 is prevented. This prevents the sense of incongruity that would occur in the case where the rotation speed R of the internal combustion engine 10 is increased from a low rotation speed after the stop request operation performed by the operator.

Figure 4:
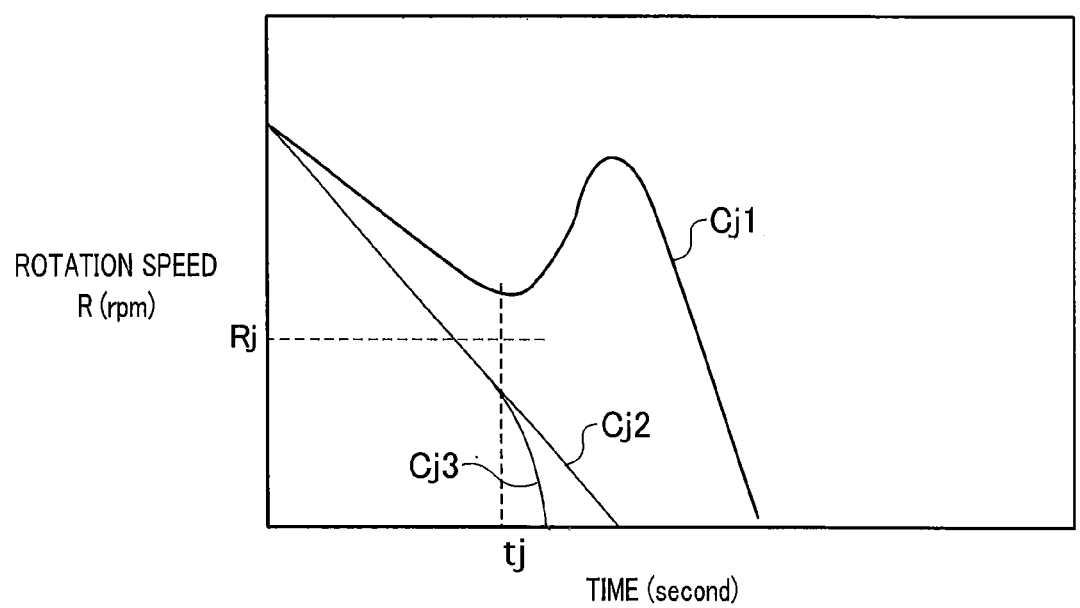
FIG. 4 is a graph illustrating the relationship between the rotation speed at the time of determination and a threshold.

As described above, the electric device illustrated in FIG. 1 performs the rotation-speed increasing control in the case where rotation speed R at the time tj of the determination is higher than threshold Rj as rotation speed characteristic Cj1 illustrated in FIG. 4. On the other hand, the rotation-speed increasing control is not performed in the case where rotation speed R at the time tj of the determination is not higher than threshold Rj as rotation speed characteristic Cj2.

Note that in the case where the rotation speed R of the internal combustion engine 10 at the time of the determination is not higher than the threshold, the control of the rotation speed R by the controller 30 does not have to be performed. The internal combustion engine 10 can be stopped in a rapid manner by, for example, letting the rotation speed R decrease while coasting down the internal combustion engine 10.

However, in the case where the rotation speed R of the internal combustion engine 10 at the time of the determination is not higher than the threshold, the rotation speed R of the internal combustion engine 10 may be decreased by rotation speed control performed by the controller 30 until the internal combustion engine 10 stops. For example, also in the case where the rotation speed R of the internal combustion engine 10 at the time of the determination is not higher than the threshold, the rotation-speed agreement control is performed on rotation speed R. By doing this, for example, in the case where rotation speed R falls sharply while the internal combustion engine 10 is coasting down as in rotation speed characteristic Cj3 illustrated in FIG. 4, the decrease of rotation speed R can be made gentle, and this reduces vibration.

The following describes the operation of the electric device illustrated in FIG. 1 for the case where the rotation speed R of the internal combustion engine 10 is unintentionally low because the internal combustion engine 10 is not supplied with fuel due to running out of fuel or other reasons. In the following, description is made of an electric device that performs control in which electric power supplied to the motor 20 for its operation is forcibly interrupted (hereinafter, referred to as "electric-power interruption control") in the case where a specified minimum rotation-speed condition holds in terms of the rotation speed R of the internal combustion engine 10. The electric-power interruption control stops the motor 20 driving the internal combustion engine 10. Here, the minimum rotation-speed condition is defined as a condition that a rotation speed lower than or equal to a specified minimum rotation speed R0 (for example, approximately 50 rpm) continues for a certain determination time Ts (for example, approximately 3 seconds).

Figure 5:
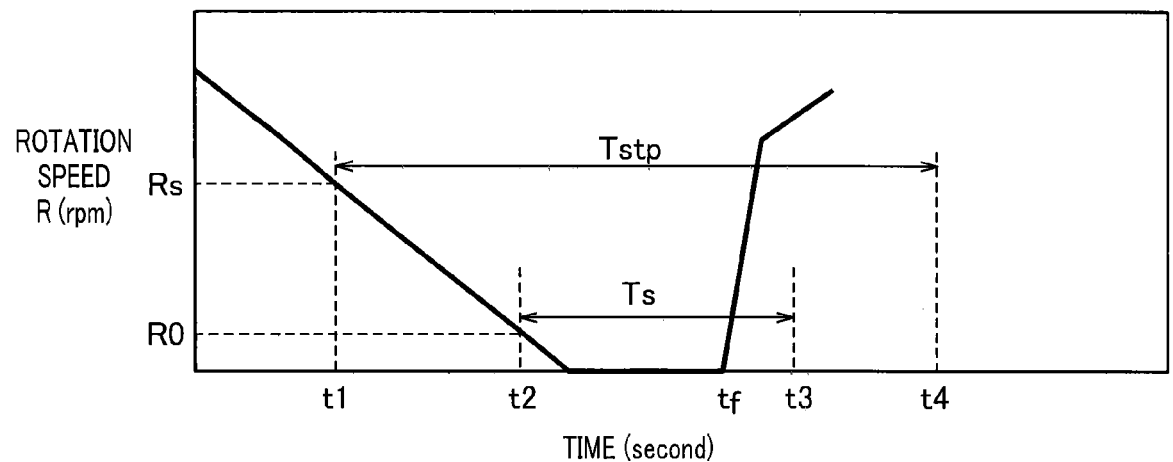
FIG. 5 is a graph illustrating the relationship between the rotation speed of the internal combustion engine and the time at which the stop operation is performed (case 1).
Figure 6:
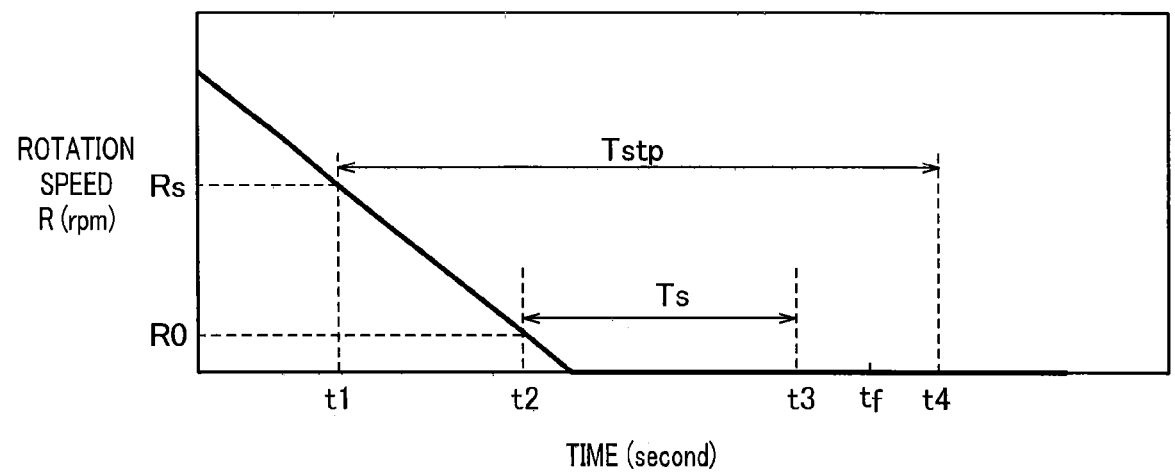
FIG. 6 is a graph illustrating the relationship between the rotation speed of the internal combustion engine and the time at which the stop operation is performed (case 2).
Figure 7:
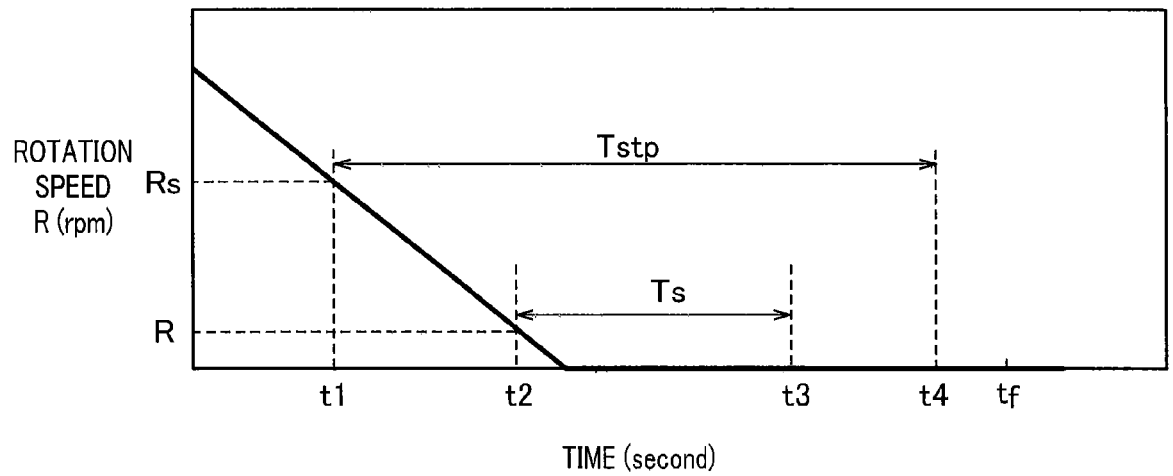
FIG. 7 is a graph illustrating the relationship between the rotation speed of the internal combustion engine and the time at which the stop operation is performed (case 3).

FIGS. 5 to 7 illustrate the relationship between the rotation speed R of the internal combustion engine 10 and time tf at which a stop operation for the internal combustion engine 10 is performed (hereinafter, simply referred to as a "stop operation"), for the case where the rotation speed R of the internal combustion engine 10 is unintentionally low due to running out of fuel. Note that the minimum rotation-speed condition holds in the case where the rotation speed R of the internal combustion engine 10 is lower than or equal to minimum rotation speed R0 from time t2 at which rotation speed R decreases to minimum rotation speed R0 to time t3 at which determination time Ts has passed since time t2. In addition, in the case where rotation speed R is lower than fuel-empty-state determination rotation speed Rs from time t1 at which rotation speed R falls below the fuel-empty-state determination rotation speed Rs to time t4 at which a specified fuel-empty-state determination time Tstp has passed since time t1, the controller 30 determines that the internal combustion engine 10 is in a fuel-empty state. For example, in the case where rotation speed R is 1000 rpm or less for more than 10 seconds, it is determined that the internal combustion engine 10 is in a fuel-empty state.

In case 1 illustrated in FIG. 5, the stop operation is performed after time t2 at which rotation speed R decreased to minimum rotation speed R0 and before determination time Ts has passed. Thus, the control signal S for increasing the rotation speed R of the internal combustion engine 10 is transmitted from the controller 30 to the motor 20. With this, the rotation-speed increasing control increases the rotation speed R of the internal combustion engine 10. As a result, the increase in the rotation speed of the internal combustion engine 10 from a low rotation speed causes the sense of incongruity.

In case 2 illustrated in FIG. 6, the stop operation is performed after time t3 at which determination time Ts has passed since time t2 at which rotation speed R decreased to minimum rotation speed R0. This means that the minimum rotation-speed condition holds. Thus, even if the controller 30 transmits the control signal S for increasing rotation speed R to the motor 20, the control for the motor 20 is made invalid. As a result, the motor 20 does not output torque T to the internal combustion engine 10, and the rotation speed R of the internal combustion engine 10 is not subjected to control.

In case 3 illustrated in FIG. 7, the stop operation is performed after determination time Ts has passed since time t2 at which the rotation speed R decreased to minimum rotation speed R0, and in addition, after time t4 at which the fuel-empty state determination is made. Since this is a stop operation after the fuel-empty state determination, the controller 30 does not transmit the control signal S for increasing rotation speed R to the motor 20.

As described above, case 1 illustrated in FIG. 5 causes the sense of incongruity resulting from the increase in the rotation speed R. However, in the case where the rotation speed R of the internal combustion engine 10 is lower than minimum rotation speed R0 due to running out of fuel or for other reasons, the rotation speed R of the internal combustion engine 10 no longer has to be increased. For this reason, there is a demand for decreasing the rotation speed or stopping the rotation without increasing rotation speed R.

Figure 8:
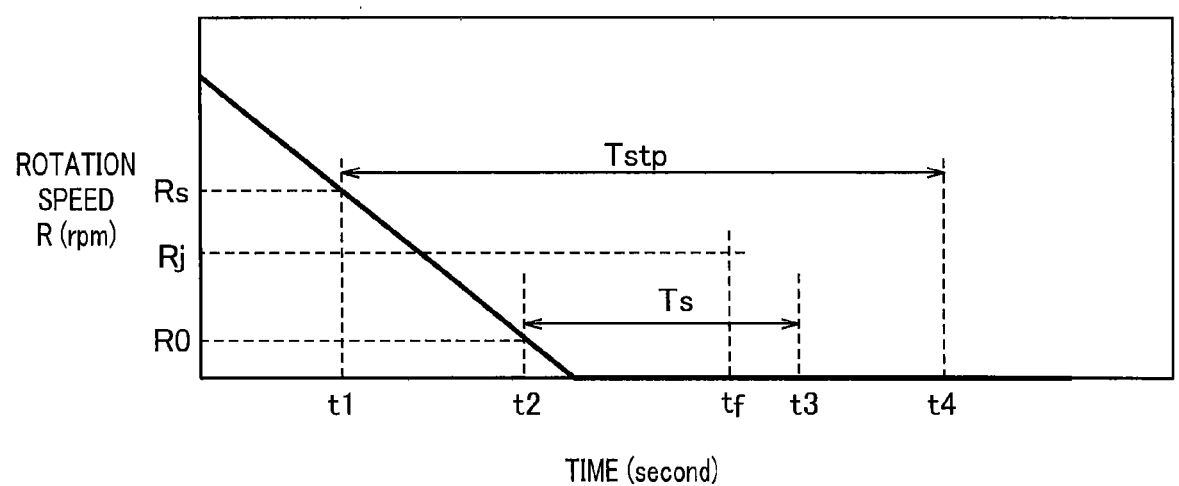
FIG. 8 is a graph illustrating the relationship between the rotation speed of the internal combustion engine in the electric device according to the embodiment of the present invention and the time at which the stop operation is performed.

Considering the above demand, in the electric device illustrated in FIG. 1, threshold Rj is set higher than minimum rotation speed R0, as illustrated in FIG. 8. With this setting, even if the stop operation is performed after time t2 at which the rotation speed R decreased to minimum rotation speed R0 and before determination time Ts has passed, rotation speed R at time tf is lower than threshold Rj. Thus, rotation speed R does not increase, preventing the occurrence of the sense of incongruity. Note that time tf at which the stop operation is performed corresponds to the time tj of the determination.

In the electric device illustrated in FIG. 1, as described above, after rotation speed R has decreased to minimum rotation speed R0, the rotation-speed increasing control is not performed even if the minimum rotation-speed condition does not hold. Thus, in the case where the rotation speed R decreases unintentionally due to running out of fuel or for other reasons, it is possible to prevent the occurrence of the sense of incongruity resulting from the stop operation.

Figure 9:
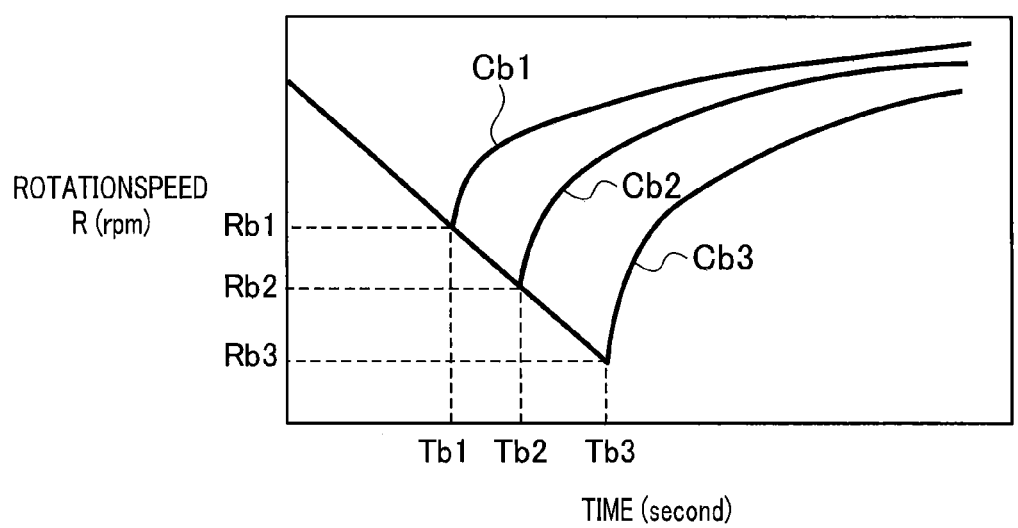
FIG. 9 is a graph for explaining an investigation in which the rotation speed at the start point of boost development is varied.

FIG. 9 shows the results of investigation on the range in which the sense of incongruity occurs, regarding the rotation speed at the start point from which rotation speed R is increased in boost development. FIG. 9 shows rotation speed characteristic Cb1 in which the boost development starts from rotation speed Rb1 at time Tb1, rotation speed characteristic Cb2 in which the boost development starts from rotation speed Rb2 at time Tb2, and rotation speed characteristic Cb3 in which the boost development starts from rotation speed Rb3 at time Tb3. Here, rotation speed Rb1>rotation speed Rb2>rotation speed Rb3. According to investigation conducted by the inventors, rotation speed characteristic Cb1 and rotation speed characteristic Cb2 do not cause the sense of incongruity, but rotation speed characteristic Cb3 causes the sense of incongruity. Hence, by setting the threshold of rotation speed R higher than rotation speed Rb3, for example, to rotation speed Rb2, it is possible to prevent the occurrence of the sense of incongruity resulting from the increase in the rotation speed of the internal combustion engine 10.

Investigation on the relationship between the rotation speed at the start point of boost development and the occurrence of the sense of incongruity makes it possible to set a proper threshold, as described above. Note that to set the threshold, details of the rotation-speed increasing control such as the degree of the increase in the rotation speed R in the boost development and the rate of the increase in the rotation speed relative to the time for increasing should preferably be taken into account.

In the electric device according to this embodiment, as described above, in the case where the rotation speed R of the internal combustion engine 10 is low, the controller 30 does not perform the rotation-speed increasing control. Thus, there is no increase in the rotation speed from a low rotation speed while the internal combustion engine 10 is transitioning to the rotation stop state, and this prevents the occurrence of the sense of incongruity. In addition, electric power does not need to be supplied to the motor 20 for an unnecessary increase in the rotation speed of the internal combustion engine 10, and this reduces electric power consumption.

Here, in the case where some rotation speed control is being performed on the internal combustion engine 10 at the time of the determination, the rotation speed control that is being performed should preferably be continued, regardless of the rotation speed R of the internal combustion engine 10 at the time of the determination. This operation prevents the occurrence of problems resulting from canceling the rotation speed control being performed. On the other hand, in the case where the rotation speed control is not being performed at the time of the determination, the controller 30 determines whether to perform the rotation-speed increasing control, based on the result of comparison between the rotation speed R of the internal combustion engine 10 at the time of the determination and the threshold.

Figure 10:
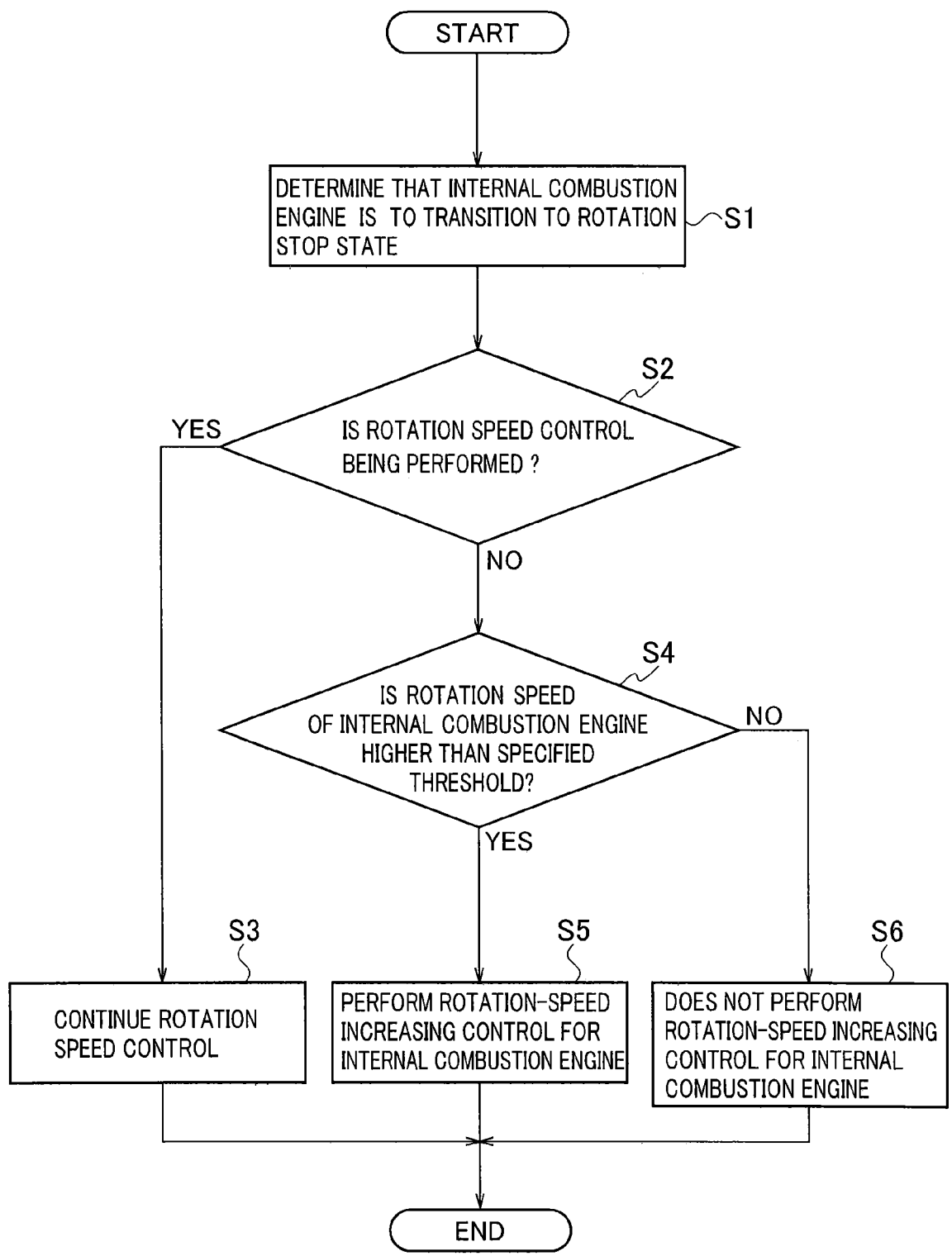
FIG. 10 is a flowchart for explaining a method for controlling the electric device according to the embodiment.

Hereinafter, a method for controlling the electric device according to the embodiment will be described with reference to a flowchart illustrated in FIG. 10.

At Step S1, the controller 30 determines that the internal combustion engine 10 is to transition to the rotation stop state, for example, by receiving a stop instruction D to stop the internal combustion engine 10 via the input device 40.

Next, at step S2, it is determined whether the rotation speed control is being performed on the internal combustion engine 10 at the time of the determination. If the rotation speed control is being performed, the process proceeds to step S3, and the rotation speed control is continued regardless of the rotation speed R of the internal combustion engine 10 at the time of the determination. If the rotation speed control is not being performed at the time of the determination, the process proceeds to step S4, where the controller 30 determines whether to perform the rotation-speed increasing control, based on the result of comparison between the rotation speed R of the internal combustion engine 10 at the time of the determination and the threshold.

Specifically, at step S4, a determination device 31 of the controller 30 compares the rotation speed R of the internal combustion engine 10 at the time of the determination detected by the rotation-speed detection device 50 with the specified threshold. Then, if the rotation speed R at the time of the determination is higher than the threshold, the process proceeds to step S5. If the rotation speed R of the internal combustion engine 10 at the time of the determination is not higher than the threshold, the process proceeds to step S6.

At step S5, the control signal S is transmitted from a control device 32 of the controller 30 to the motor 20 to perform the rotation-speed increasing control.

At step S6, the rotation-speed increasing control is not performed. In this case, the internal combustion engine 10 coasts down and stops, or it stops according to rotation speed control such as the rotation-speed agreement control or the like. Note that even in the case where the internal combustion engine 10 coasts down and stops, the occurrence of the sense of incongruity is prevented because rotation speed R is low.

The method for controlling the electric device according to the foregoing embodiment prevents the occurrence of the sense of incongruity resulting from the stop operation for the internal combustion engine. It also reduces electric power consumption of the motor 20.

For the electric device illustrated in FIG. 1, in the case of performing the rotation-speed increasing control, if the rotation speed R of the internal combustion engine 10 at the time when it is determined that the internal combustion engine 10 is to transition to the rotation stop state is higher than a specified threshold, the rotation speed of the internal combustion engine 10 increases. On the other hand, if the rotation speed R of the internal combustion engine 10 at the time of the determination is not higher than the threshold, the rotation speed of the internal combustion engine 10 monotonously decreases.

The above description has been made of the case where the controller 30 performs the rotation-speed increasing control for temporarily increasing rotation speed R. However, determining whether to perform rotation speed control based on the result of comparison between rotation speed R and the threshold is effective even for the case of rotation speed control in which the rotation speed R is not increased.

Figure 11:
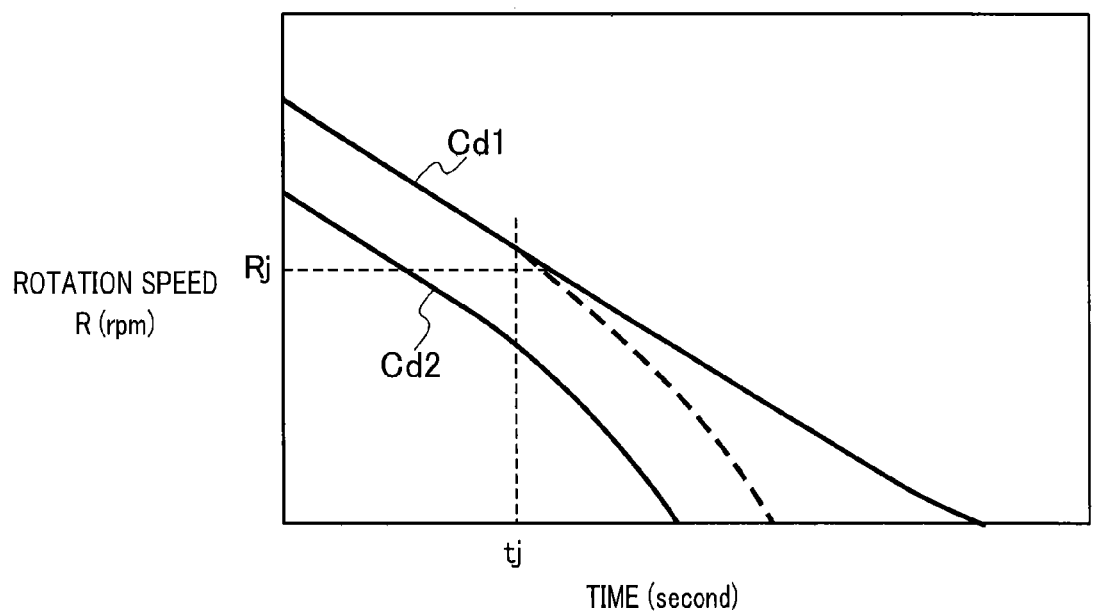
FIG. 11 is a graph illustrating an example of rotation speed control.

For example, also in rotation speed control for monotonously decreasing the rotation speed R of the internal combustion engine 10 as in rotation speed characteristic Cd1 illustrated in FIG. 11, gently decreasing rotation speed R as indicated by a solid line prevents the sense of incongruity. Specifically, it is possible to prevent the sense of incongruity caused when the rotation speed sharply decreases from a high rotation speed while the internal combustion engine 10 is coasting down as illustrated by the dashed line in FIG. 11. Note that the rotation speed control for rotation speed characteristic Cd1 indicated by a solid line in FIG. 11 can be implemented using rotation-speed agreement control or the like.

Note that in the case where rotation speed R decreases from a low rotation speed, the sense of incongruity does not occur even when rotation speed R decreases as the internal combustion engine 10 is coasting down. Thus, a configuration may be possible in which in the case where rotation speed R at the time tj of the determination is lower than threshold Rj as in rotation speed characteristic Cd2 illustrated in FIG. 11, rotation speed R is not subjected to control. In that case, threshold Rj is set to a rotation speed that does not cause the sense of incongruity even when rotation speed R decreases from the rotation speed as the internal combustion engine 10 is coasting down.

Meanwhile, there are cases where the internal combustion engine 10 is set to rotate at a specified idling rotation speed before transitioning to the rotation stop state. The idling rotation, for example, makes the motor 20 generate electric power or increases the temperature of engine water and exhaust catalyst. This idling rotation speed is determined depending on the purpose.

Figure 12:
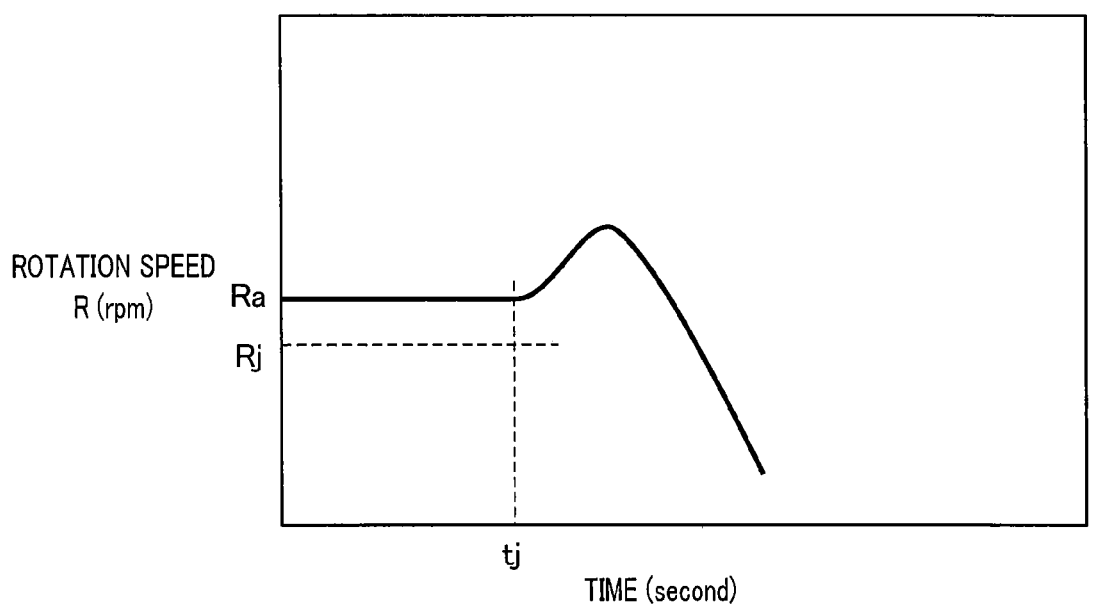
FIG. 12 is a graph for explaining idling rotation.

Also, for an internal combustion engine 10 configured to perform idling rotation, the rotation-speed increasing control prevents the occurrence of the sense of incongruity. For this reason, for example, as illustrated in FIG. 12, threshold Rj of rotation speed R should preferably be set lower than idling rotation speed Ra. In an internal combustion engine 10 configured to perform idling rotation, in the case where idling rotation speed Ra is higher than threshold Rj, the rotation-speed increasing control makes rotation speed R temporarily higher than idling rotation speed Ra.

As stated above, the idling rotation speed is set to different values depending on the purpose. For this reason, threshold Rj of rotation speed R is set lower than the minimum rotation speed of idling rotation speeds. Note that it is assumed that the idling rotation speed has some variation. Thus, when threshold Rj of rotation speed R is set lower than the minimum rotation speed of the idling rotation speeds, threshold Rj should preferably be set in consideration of the variation of the idling rotation speed. Specifically, threshold Rj is set lower than the rotation speeds expected when the minimum rotation speed of the idling rotation speeds varies.

As for the variation of the idling rotation speed, it is preferable to take into account both the variation of the idling rotation speed in the state where the internal combustion engine 10 is independently rotating and the variation of the idling rotation speed in the state the internal combustion engine 10 is rotating being driven by the motor 20.

Other Embodiments

Although the embodiment of the present invention has been described as above, it should not be understood that the descriptions and drawings constituting part of this disclosure limit the invention. From this disclosure, various alternative embodiments, examples, and operational techniques will be apparent to those skilled in the art.

For example, the above description is based on a case where when the controller 30 receives a stop instruction D to stop the internal combustion engine 10, the controller 30 determines that the internal combustion engine 10 is to transition to the rotation stop state. However, the controller 30 may determine by another method that the internal combustion engine 10 is to transition to the rotation stop state. For example, the controller 30 monitors the state of the internal combustion engine 10, and the controller 30 determines that the internal combustion engine 10 is to transition to the rotation stop state, in the case where the rotation speed R of the internal combustion engine 10 decreases or in like cases.

The present invention is applicable to not only cases where the internal combustion engine 10 transitions to the rotation stop state by the stop request operation performed by the driver but also cases it transitions by another stop request operation.

The electric device according to the present invention can be used for performing control to stop the rotation of an internal combustion engine.

REFERENCE SIGNS LIST 10 internal combustion engine
20 motor
30 controller
31 determination device
32 control device
40 input device
50 rotation-speed detection device

The invention claimed is:

1. A method for controlling an electric device including an internal combustion engine and a motor that drives the internal combustion engine, the method comprising the steps of:
   comparing the rotation speed of the internal combustion engine at the time when it has been determined that the internal combustion engine is to transition to a rotation stop state with a specified threshold; and
   in a case where the rotation speed of the internal combustion engine at the time of the determination is higher than the threshold, performing rotation-speed increasing control for making the rotation speed of the internal combustion engine temporarily higher than the rotation speed at the time of the determination with a throttle remaining closed, wherein
   in a case where the rotation speed of the internal combustion engine at the time of the determination is not higher than the threshold, the rotation speed of the internal combustion engine is not made higher than the rotation speed at the time of the determination but is let to decrease to stop the internal combustion engine.

2. The method for controlling an electric device according to claim 1, wherein the torque of the motor outputted to the internal combustion engine is controlled to set the rotation speed of the internal combustion engine.

3. The method for controlling an electric device according to claim 1, wherein the rotation-speed increasing control is performed by controlling the motor to perform rotation-speed agreement control for making the rotation speed of the internal combustion engine in agreement with a target rotation speed.

4. The method for controlling an electric device according to claim 3, wherein
   in the case where the rotation speed of the internal combustion engine at the time of the determination is not higher than the threshold, the rotation-speed agreement control is not performed.

5. The method for controlling an electric device according to claim 3, wherein
   in the case where the rotation speed of the internal combustion engine at the time of the determination is not higher than the threshold, the rotation-speed agreement control is performed to make the rotation speed of the internal combustion engine decrease from the rotation speed at the time of the determination and stop the internal combustion engine.

6. The method for controlling an electric device according to claim 3, wherein the rotation-speed increasing control includes controlling the rotation speed of the internal combustion engine using the rotation-speed agreement control until the rotation of the internal combustion engine stops.

7. The method for controlling an electric device according to claim 1, wherein it is determined that the internal combustion engine is to transition to the rotation stop state, based on stop request operation performed by an operator of the electric device.

8. The method for controlling an electric device according to claim 1, wherein
the internal combustion engine is set to rotate at a specified idling rotation speed before transitioning to the rotation stop state, and
the rotation-speed increasing control include making the rotation speed of the internal combustion engine temporarily higher than the idling rotation speed.

9. The method for controlling an electric device according to claim 8, wherein the threshold is lower than the minimum rotation speed of the idling rotation speed.

10. The method for controlling an electric device according to claim 1, wherein
in a case where rotation speed control for the internal combustion engine is being performed at the time of the determination, the rotation speed control is continued regardless of the rotation speed of the internal combustion engine at the time of the determination, and
in a case where the rotation speed control for the internal combustion engine is not being performed at the time of the determination, whether to perform the rotation-speed increasing control is determined based on result of comparison between the rotation speed of the internal combustion engine at the time of the determination and the threshold.

11. An electric device comprising:
an internal combustion engine;
a motor that drives the internal combustion engine; and
a controller, wherein
in a case where the rotation speed of the internal combustion engine at the time when it has been determined that the internal combustion engine is to transition to a rotation stop state is higher than a specified threshold, the controller performs rotation-speed increasing control for making the rotation speed of the internal combustion engine temporarily higher than the rotation speed at the time of the determination with a throttle remaining closed, and
in a case where the rotation speed of the internal combustion engine at the time of the determination is not higher than the threshold, the rotation speed of the internal combustion engine does not become higher than the rotation speed at the time of the determination but decreases, and the internal combustion engine stops.

12. The electric device according to claim 11, wherein the controller controls the torque of the motor outputted to the internal combustion engine to set the rotation speed of the internal combustion engine.

13. The electric device according to claim 11, wherein the controller performs the rotation-speed increasing control by controlling the motor to perform rotation-speed agreement control for making the rotation speed of the internal combustion engine in agreement with a target rotation speed.

14. The electric device according to claim 13, wherein
in the case where the rotation speed of the internal combustion engine at the time of the determination is not higher than the threshold, the controller does not perform the rotation-speed agreement control.

15. The electric device according to claim 13, wherein
in the case where the rotation speed of the internal combustion engine at the time of the determination is not higher than the threshold, the controller performs the rotation-speed agreement control to make the rotation speed of the internal combustion engine decrease from the rotation speed at the time of the determination and stop the internal combustion engine.

16. The electric device according to claim 13, wherein
in the rotation-speed increasing control, the controller controls the rotation speed of the internal combustion engine using the rotation-speed agreement control until the rotation of the internal combustion engine stops.

17. The electric device according to claim 11, wherein it is determined that the internal combustion engine is to transition to the rotation stop state, based on stop request operation performed by an operator of the electric device.

18. The electric device according to claim 11, wherein
the internal combustion engine is set to rotate at a specified idling rotation speed before transitioning to the rotation stop state, and
in the rotation-speed increasing control, the controller makes the rotation speed of the internal combustion engine temporarily higher than the idling rotation speed.

19. The electric device according to claim 18, wherein the threshold is lower than the minimum rotation speed of the idling rotation speed.

20. The electric device according to claim 11, wherein
in a case where rotation speed control for the internal combustion engine is being performed at the time of the determination, the rotation speed control is continued regardless of the rotation speed of the internal combustion engine at the time of the determination, and
in a case where the rotation speed control for the internal combustion engine is not being performed at the time of the determination, the controller determines whether to perform the rotation-speed increasing control, based on result of comparison between the rotation speed of the internal combustion engine at the time of the determination and the threshold.

21. An electric device comprising:
an internal combustion engine; and
a motor that drives the internal combustion engine, wherein
in a case where the rotation speed of the internal combustion engine at the time when it has been determined that the internal combustion engine is to transition to a rotation stop state is higher than a specified threshold, the rotation speed of the internal combustion engine increases with a throttle remaining closed, and
in a case where the rotation speed of the internal combustion engine at the time of the determination is not higher than the threshold, the rotation speed of the internal combustion engine monotonously decreases.

22. The electric device according to claim 21, wherein
the internal combustion engine is set to rotate at a specified idling rotation speed before transitioning to the rotation stop state, and
in the case where the rotation speed of the internal combustion engine at the time of the determination is higher than the threshold, the rotation speed of the internal combustion engine becomes temporarily higher than the idling rotation speed.

23. The electric device according to claim 22, wherein the threshold is lower than the minimum rotation speed of the idling rotation speed.

* * * * *